N. CROCKENBERGER.
FLY CATCHER.
APPLICATION FILED JULY 21, 1916.

1,260,339.

Patented Mar. 26, 1918.
4 SHEETS—SHEET 2.

Witnesses

Inventor
N. Crockenberger,
By H. L. Woodward
Attorney

N. CROCKENBERGER.
FLY CATCHER.
APPLICATION FILED JULY 21, 1916.

1,260,339.

Patented Mar. 26, 1918.
4 SHEETS—SHEET 3.

Witnesses

Inventor
N. Crockenberger,
By H. L. Woodward
Attorney

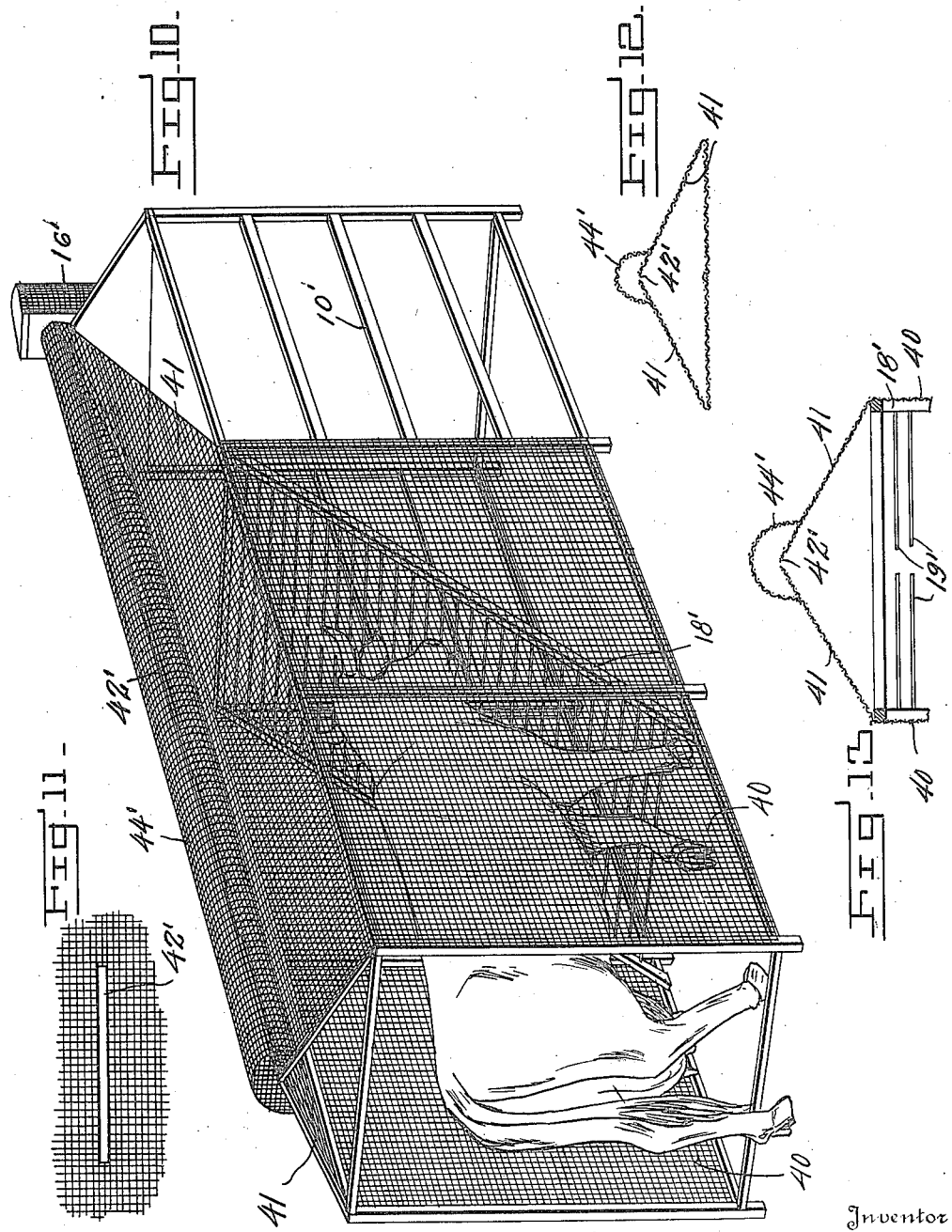

UNITED STATES PATENT OFFICE.

NICKLESS CROCKENBERGER, OF OLPE, KANSAS.

FLY-CATCHER.

1,260,339.

Specification of Letters Patent.

Patented Mar. 26, 1918.

Application filed July 21, 1916. Serial No. 110,540.

*To all whom it may concern:*

Be it known that I, NICKLESS CROCKENBERGER, a citizen of the United States, residing at Olpe, in the county of Lyon and State of Kansas, have invented certain new and useful Improvements in Fly-Catchers, of which the following is a specification.

This invention relates to fly catchers, and more particularly to devices of this character intended to catch insects on a very large scale, wherefore it is an important object to provide such construction as may be readily constructed in a very large size, which will be efficient in action. Another important aim of the invention is to provide a new and novel construction of trap cones by which flies may be admitted to the trap without impeding each other's progress, and whereby flies may be readily trapped in very large numbers in proportion to a given size of trap. Another important aim of the invention is to provide a novel form of bait and baffle device by which flies tending to pass beneath the trap are caused to stop, whereby they will tend to move into the trap, as will become apparent. It is noted that flies at times seek moderately dark dry places, although in the main they tend to move toward the light. It is an important aim of the present invention to take advantage of this tendency of flies at times to seek dark and sheltered places. In a great many particulars the trap is very desirable for trapping various other insects besides flies, as will be understood.

Figure 1:
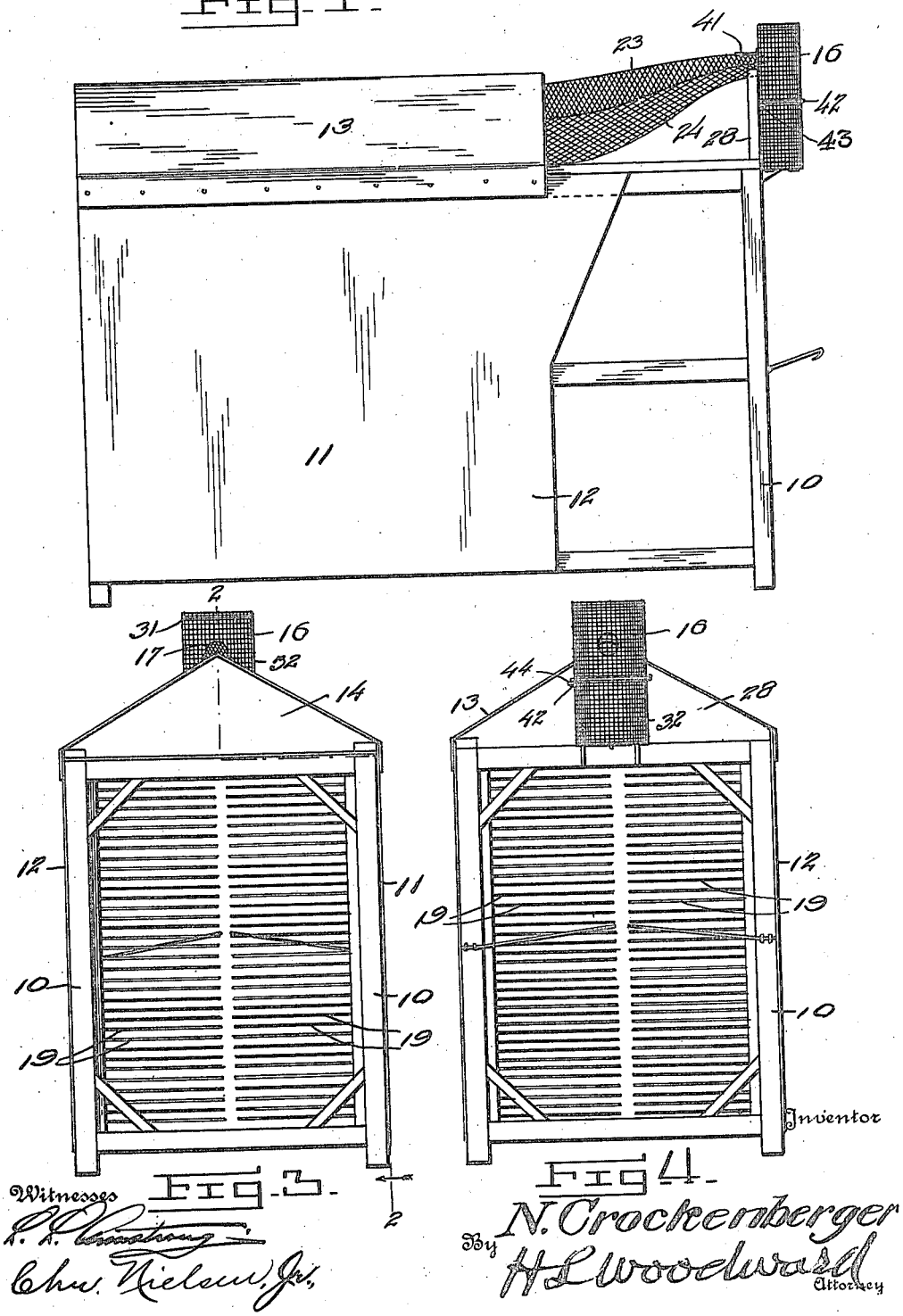
Figure 2:
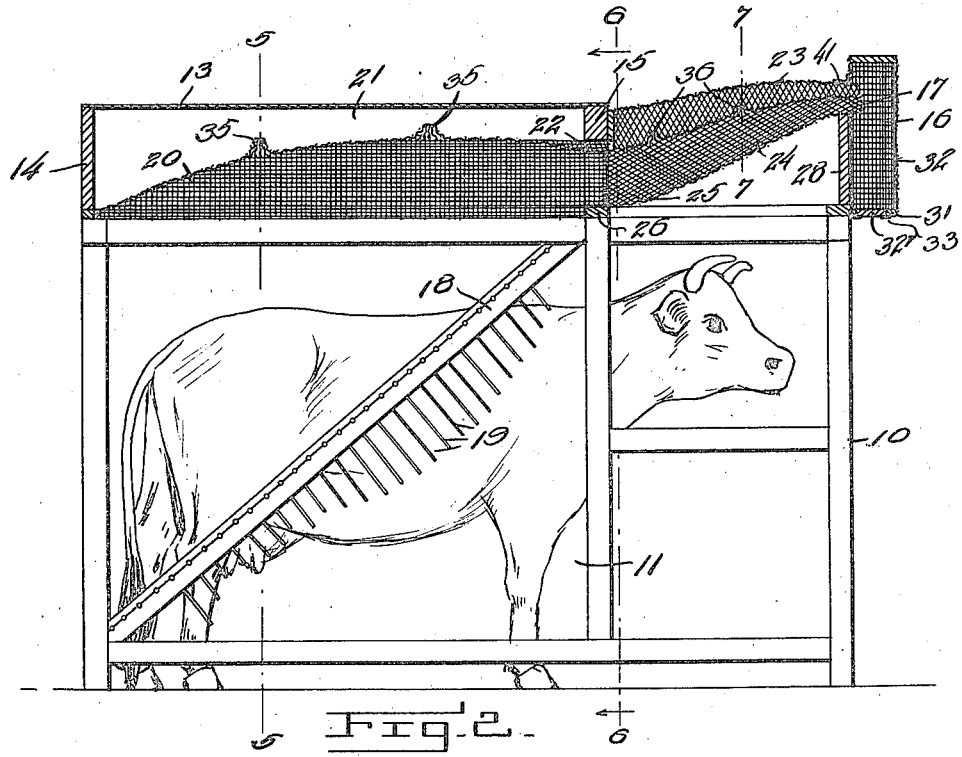
Figure 3:
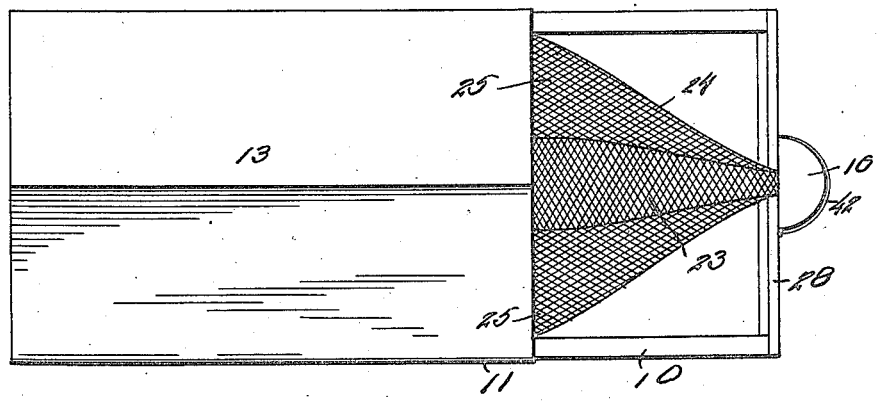
Figure 5:
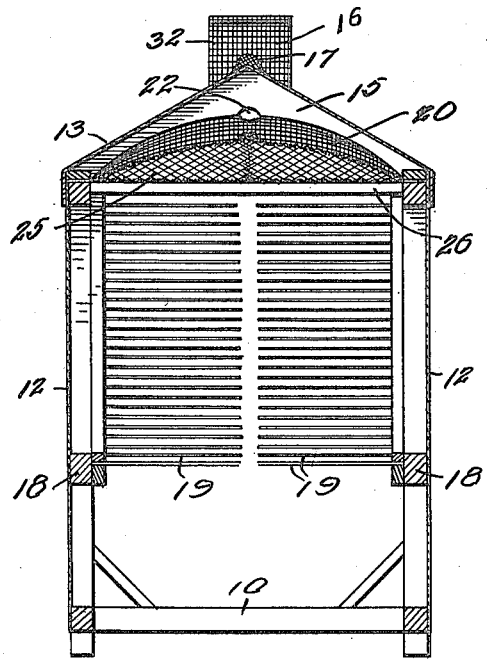
Figure 6:
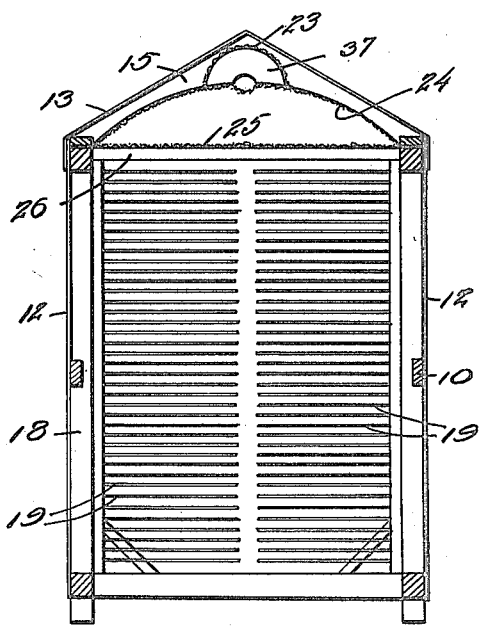
Figure 7:
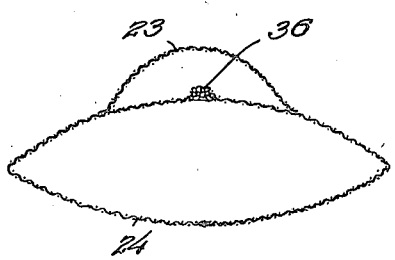
Figure 9:
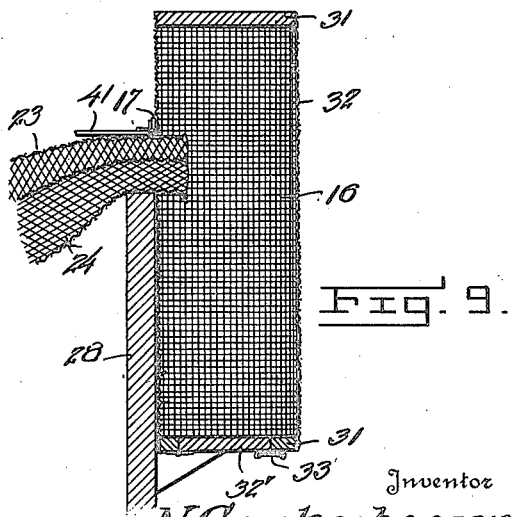

Additional objects, advantages and features of invention will be apparent from the construction arrangement and combination of parts hereinafter described and shown in the drawings, where, Figure 1 is a side elevation of the trap, Fig. 2 is a longitudinal sectional view thereof, Fig. 3 is an end view of the trap at the entrance, Fig. 4 is a similar view at the opposite end, Fig. 5 is a fragmentary cross section on the line 5—5 of Fig. 2, Fig. 6 is a similar view on the line 6—6 of Fig. 2, Fig. 7 is a similar view on the line 7—7 of Fig. 2, Fig. 8 is a top view of the device, Fig. 9 is a detail of the trap receptacle, Fig. 10 is a perspective view of a modified form, Fig. 11 shows the form of one of the slots, Fig. 12 is a cross section at the rear part of the device, Fig. 13 is a fragmentary section at the forward part.

There is illustrated a frame work 10 of suitable construction for supporting the elements hereinafter, the details of which frame are discretionary, and may be adapted to the size and proportion of the catchers. At one end the frame includes a housing 11, including sides 12 of sheet metal, a roof portion 13 of similar material, an outer end wall 14, and an inner arched wall 15 intermedially of the length of the frame work, and by which walls the roof is supported at respective ends. The bases of these walls coincide with the level of the upper part of the frame, and their upper portions are coincident with the slope of the roof, which is gabled. At the end of the frame opposite the housing there is mounted a trap receptacle 16, having an ingress opening 17, above the level of the wall 15, as shown. Beneath the housing diagonal supports 18 are mounted in the frame, at each side, inclined upwardly and inwardly from adjacent the bottom of the frame at the entrance thereof to points closely adjacent the top of the frame. Each of these carries a multiplicity of horizontal inwardly projected parallel wires or brushes 19. The wires from the opposite sides stop short of each other a very short distance, centrally of the space within the frame, which is otherwise open. The frame is so constructed that large clear spaces are open at the ends communicating with the space within the frame, as shown. Secured across the top of the frame beneath the roof there is a piece of ordinary fine screen 20, extending from the base of the wall 14 inwardly, and connected securely to the upper part of the frame at the sides so as to form a dark chamber 21, beneath the roof. This screen is inclined upwardly toward and attached to, the lower edge of the arched wall 15. A small outlet opening 22 is formed immediately over this screen at the lower edge of the wall at the highest point. Immediately over the opening 22 a screen covering 23 is attached to the wall 15, transversely arched, and extended to the opening 17 of the trap 16 being tapered toward its outer part. A cone device 24 is mounted beneath this screen element 23, semi-ovate in cross section, its upper edge portion being attached to the under edge of the wall 15, while its lower part 25 is attached to a cross piece 26 mounted on top of the frame. The mouth of this cone member opens toward the space beneath the screen element 20 taking up the full width of the space across the frame 10 beneath the wall 15. The edges of the member 23 are attached to the upper side of the cone member, so that in effect a double cone is formed. The cone member tapers outwardly, and extends to the opening 17 of the trap 16, having a separate entrance thereto from the member 23, although this may not be found essential. The outer end of the cone member 24 and member 23 are engaged through a suitable aperture in a wall 28, mounted across the end of the frame 10, and to which the trap 16 is secured. The trap 16 comprises semi-circular pieces 31, around which is fastened a piece of screen material 32, of suitable character, joined to the sides of the pieces 31. In the bottom member 31 there is provided a small door 32' secured by a catch 33, by which the trap receptacle may be emptied from time to time. If desired, the receptacle may be supported detachably upon the wall 28 in any convenient way, so that it may be easily removed for cleansing, and for drowning of the flies if desired.

In the member 20 a plurality of small cones 35 are formed, extending upwardly and having a small opening at their upper parts communicating with the chamber 21, and at the upper side of the cone member 24 a number of similar cone portions 36 are formed communicating with the space beneath the screen element 23 thereover.

In use, the wires 19 may be provided with any customary baiting for flies and the catcher arranged where it is desired. The wires 19 have the effect of preventing flies from passing through the space beneath the trap directly, without stopping, and causes them to alight thereon, and they naturally tend to pass therefrom into the partly darkened chamber 21, or on to the screen 20, from which they tend to crawl toward the light and into the cone 24, if they do not pass upwardly through the trap openings 35 into the chamber 21. From the chamber 21 the flies naturally tend to crawl toward the opening 22, since that is the direction from which the most light enters the chamber, and thereby they are led into the passage beneath the screen 23, whence they ultimately pass into the trap 16 by reason of the upward inclination of the member 23 and the tendency of the fly to crawl upwardly.

It is an advantage of the device that where the flies come in very large swarms, and some tend to escape before they pass into the chamber 21 and pass beneath the member 23, the large mouth of the cone 24 will accommodate those that tend to crawl away before they pass into the chamber, and they are thus more quickly trapped. After passing into the cone 24 the several trap openings 36 permit passage of a large number of flies directly into the passage under the screen 23, so that the flies are afforded a larger opportunity for entering the trap, while at the same time being held by the cone 24 from escaping in the meantime.

It is to be noted that the screen 23 is transversely arched and elevated some distance over the upper side of the cone 24, its base being secured to the wall 15 by providing a small semi-circular block 37 on the outer side of the wall to which the screen may be secured in any usual manner. The edges of the screen 23 are secured to the cone 24 by soldering at intervals or may be secured in any other desired way. The ends of the member 23 and the cone 24 preferably project through the wall 28 into the receptacle 16 a short distance. If the receptacle is made detachable, a small spring pressed door 41 may be hinged thereon over the opening through which the trap elements project, the spring tending normally to close the door, and when the trap is in engaged position, the door may rest against the upper side of the wall 28, as illustrated. The means by which the trap 16 is secured as shown consists simply of a loop of wire 42 secured at one side to the wall, and having a hook 43 at the other end engaged removably in a suitable eye 44 in the wall 28, at the other side of the receptacle 16.

In Fig. 10 there is illustrated a form of the device which may be considered preferable, in which the lower part of the structure is constructed substantially as before described, including a similar rectangular frame work 10' and the brush rack 18' having elements 19' all arranged similarly to similar parts before described. The frame 10', however, is somewhat more elongated at the front portion, providing more space within the device in front of the brush rack, and the sides are inclosed with netting 40 instead of opaque material. The same work is also covered over with a roof of screening material 41, sloping downwardly on each side from a suitably supported ridge. By having a number of rafters supporting the roof screen, it may not be found necessary to have a ridge pole running throughout the length of the structure, although if necessary a ridge pole may be incorporated. The roof screening is provided with medial longitudinally extending slots 42', and over the apex of the roof a semi-circular conduit 44' of screen material is built, joined at its longitudinal edges to the roof screening, closed at the forward end of the roof, and opening at its rear end into a receptacle 16', similar to the one before described.

As shown the screen material is omitted at the sides of the frame work in the rear and over a portion of the upper part at the rear corners, although this is not material and the screening may be extended throughout the upper part and sides of the frame work if desired.

What is claimed:

A fly catcher comprising a housing open on one or more sides, and including a roof, a trap receptacle spaced from the housing, a screen beneath the roof portion a distance inclined upwardly toward the receptacle means closing the space between the screen and roof to form a chamber, an outlet opening being provided over the screen at its upper part, a plurality of conical traps formed in the screen beneath the roof, a screen cone leading from the upper part of the screen beneath the roof to the receptacle its upper side forming a continuation of said screen and being continuously inclined upwardly to the receptacle, whereby insects tending to pass continuously upward beneath the screen will be trapped and collected in the receptacle, a plurality of conical traps opening from said cones upwardly and a screen thereover forming a passage from said outlet opening to the receptacle, whereby insects trapped over the screen will be collected in the receptacle, said last named traps opening therewithin.

In testimony whereof I have affixed my signature in presence of two witnesses.

NICKLESS CROCKENBERGER.

Witnesses:
 FRED J. VOESTE,
 MADK SCHNEIDER.